United States Patent [19]
Dickson et al.

[11] Patent Number: 5,644,700
[45] Date of Patent: Jul. 1, 1997

[54] METHOD FOR OPERATING REDUNDANT MASTER I/O CONTROLLERS

[75] Inventors: Kevin Arthur Dickson; Wayne Kenneth Stonehouse, both of Winnipeg, Canada

[73] Assignee: Unisys Corporation, Blue Bell, Pa.

[21] Appl. No.: 319,502

[22] Filed: Oct. 5, 1994

[51] Int. Cl.$^6$ .................................................. G06F 11/00
[52] U.S. Cl. ........................... 395/182.07; 395/183.06; 395/182.09; 395/182.2; 395/183.2
[58] Field of Search ..................... 395/182.07, 182.08, 395/182.09, 182.1, 182.11, 182.2, 183.2, 183.06; 364/230, 230.2, 230.4, 241, 241.1, 238.3, 238.4, 931.44, 931.45, 943.91, 944.2

[56] References Cited

U.S. PATENT DOCUMENTS

| | | | |
|---|---|---|---|
| 3,882,455 | 5/1975 | Heck et al. | 395/182.09 |
| 4,412,281 | 10/1983 | Works | 395/182.02 |
| 4,521,871 | 6/1985 | Galdun et al. | 395/182.09 |
| 4,527,271 | 7/1985 | Hallee et al. | 395/182.07 |
| 4,634,110 | 1/1987 | Julich et al. | 395/182.09 |
| 4,914,657 | 4/1990 | Walter et al. | 371/36 |
| 5,155,729 | 10/1992 | Rysko et al. | 395/182.09 |
| 5,202,822 | 4/1993 | McLaughlin et al. | 395/182.09 |
| 5,255,367 | 10/1993 | Bruckert et al. | 395/182.09 |
| 5,337,414 | 8/1994 | Hashemi et al. | 395/275 |
| 5,339,408 | 8/1994 | Bruckert et al. | 395/182.09 |
| 5,398,329 | 3/1995 | Hirata et al. | 395/182.09 |
| 5,491,787 | 2/1996 | Hashemi | 395/182.09 |

*Primary Examiner*—Robert W. Beausoliel, Jr.
*Assistant Examiner*—Joseph E. Palys
*Attorney, Agent, or Firm*—J. Ronald Richebourg; Mark T. Starr; Steven R. Petersen

[57] ABSTRACT

The disclosed invention is a method in a computer peripheral control system for initializing and monitoring operations of a plurality of peripheral device controllers. The system includes more than one master controller. The method comprises the steps of storing in registers of the master controllers an initial set of parameters for operation of the control system, executing a self test of each of the master controllers to determine if any errors have occurred; and if so, checking to verify presence of a redundant master controller. The method further includes detecting whether or not the redundant master controller is in control; if not, setting bus active control signals; enabling active clock output signals; initializing status bus address pointer; polling a selected one of the peripheral device controllers; checking for end of cabinet address; incrementing status bus address pointer; and repeating the steps of initializing through incrementing.

9 Claims, 7 Drawing Sheets

METHOD FOR OPERATING REDUNDANT MASTER I/O CONTROLLERS

FIELD OF THE INVENTION

The disclosed invention generally relates to a method for controlling and monitoring operation of a plurality of storage data modules for a computer system and more particularly to the use of redundant master controllers, each being operational as either a primary or a secondary controller.

BACKGROUND OF THE INVENTION

The monitoring of environmental conditions in computer systems and especially peripheral devices for such systems is of utmost importance. The sooner a problem or potential problem is detected, the better. Moreover, a rapid response to a potential problem and especially to an existing problem is critical. Systems in the past employed heat exhaustion fans and warning lights to signify a problem. Also, warning sirens or horns were used to notify an operator of a problem. However, time is crucial in correcting a problem. Better yet, if a problem could be anticipated and corrected before it became a crisis then so much the better.

However, a downside risk associated with adding circuitry for environmental monitoring is that the Mean Time Between Failure ("MTBF") for the peripheral device cabinet is compromised due to the increased chances of a single point failure occurring somewhere within the system. On the other hand if a backup parallel system could be added that would take over control in the event of a failure, the MTBF would again approach the same value as if no monitoring circuitry were present.

BRIEF SUMMARY OF THE INVENTION

It is desirable to have a system that will provide as much advance warning of a potential problem as is possible. It is also desirable to have a system that can correct, where feasible, a potential problem.

It is an object of the present invention to provide a method for a backup system where a problem occurs in the environmental conditions of an enclosure housing peripheral devices.

The present invention provides a method in a computer peripheral control system for initializing and monitoring operations of a plurality of peripheral device controllers. The system includes more than one master controller. The method comprises the steps of storing in registers of the master controllers an initial set of parameters for operation of the control system, executing a self test of each of the master controllers to determine if any errors have occurred; and if so, checking to verify presence of a redundant master controller. The method further includes detecting whether or not the redundant master controller is in control; if not, setting bus active control signals; enabling active clock output signals; initializing status bus address pointer; polling a selected one of the peripheral device controllers; checking for end of cabinet address; incrementing status bus address pointer; and repeating the steps of initializing through incrementing.

DETAILED DESCRIPTION

Figure 1:
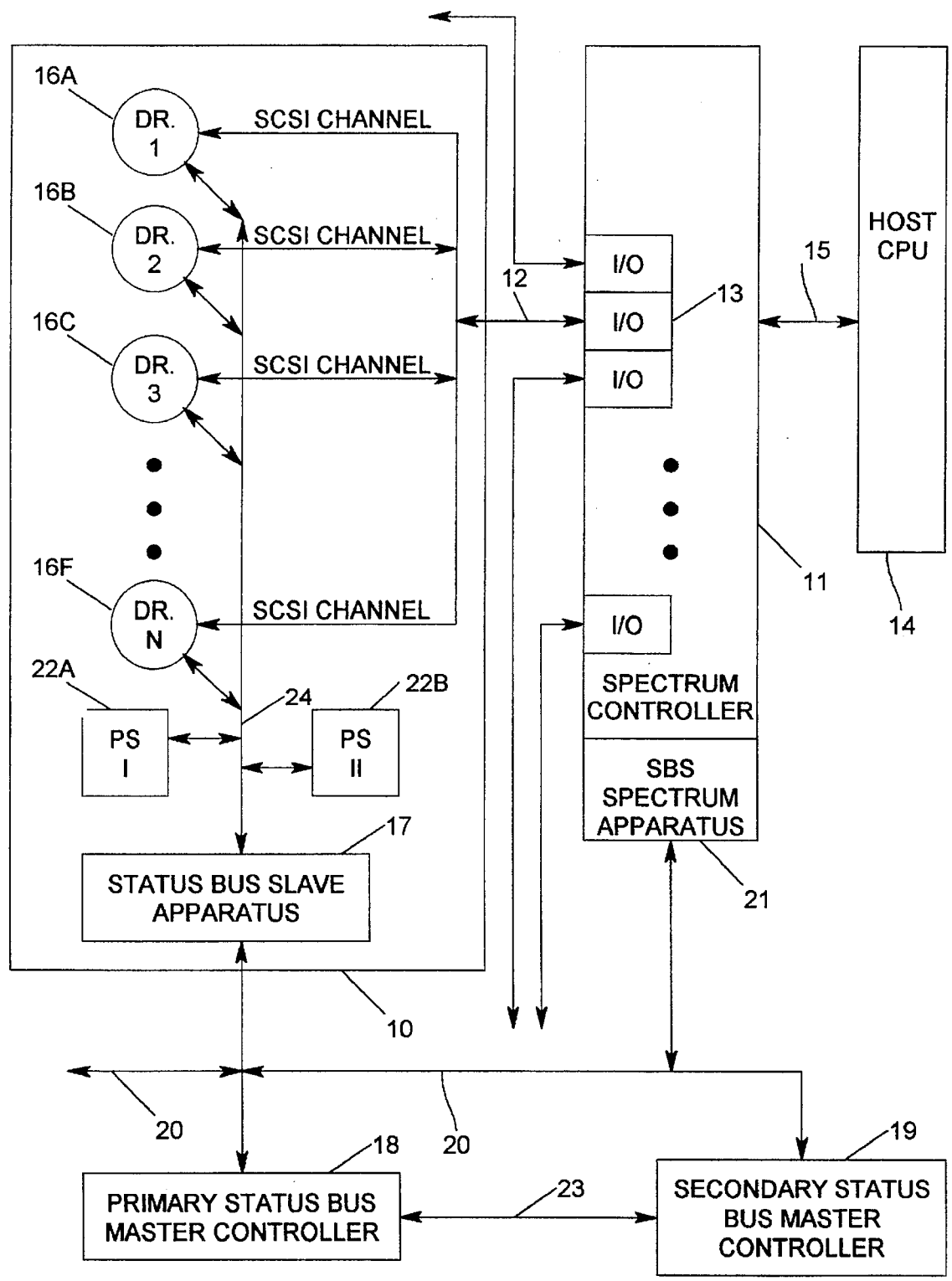
FIG. 1 is an overall block diagram of a computer system having coupled thereto a Storage Data Module and Status Bus Master Controller employing the method of the present invention.

Referring now to the drawings and to FIG. 1 in particular, a partial block diagram of a computer system is shown with an exemplary Storage Data Module ("SDM") 10 attached to a spectrum controller 11 via a SCSI (Small Computer System Interface) channel 12 to an I/O port 13. The controller 11 may typically be a part of the Unisys USP2010 Subsystem, and in the disclosed embodiment is connected to a host computer 14 by means of a bus 15. The SDM 10 includes a plurality of input/output devices, which in the illustrated embodiment comprise disk drives 16A–16F, that are coupled to the SCSI channel 12 for transmission of data to and from the host computer 12 via the port 13. The drives 16A–16F are controlled by a Status Bus Slave ("SBS") apparatus 17 over a set of control lines 24, which is also referred to herein as the backplane.

The SBS 17 receives instruction data and control signals from a first Status Bus Master Controller ("SBMC") 18 or a secondary or backup SBMC 19 over a bus 20, which may be coupled to a plurality of SDM'S similar to the SDM 10. Only one of the SBMC's 18 or 19 may be in control of the status bus 20 at any given time. The non-controlling SBMC acts as a Status Bus Slave, receiving instruction data and control signals from the active SBMC over the SBS bus 20 and by an interconnect cable 23.

The active or master SBMC, either 18 or 19, collects status information from the plurality of SDM's similar to SDM 10 and transfers that information to the host CPU 14 through an SBS spectrum apparatus 21 and the spectrum controller 11 via lines 20 and 15, respectively. The spectrum controller 11 and the SBS spectrum apparatus 21 are described and explained in greater detail in U.S. Pat. No. 5,337,414, entitled MASS DATA STORAGE AND RETRIEVAL SYSTEM by Hashemi, et al. and assigned to the same assignee hereof.

Power supplies 22A and 22B, are coupled to the backplane 24 and are disposed for providing power to the SDM 10. These power supplies are controlled and monitored by the SBS 17. It is noted that the connections to the backplane 24 are for control and environmental monitoring and do not constitute the actual provision of power. The actual power connections to the power supplies are not shown since they are conventional.

The above-described connections are bilateral, as will be amplified in greater detail hereinbelow, which allows for the monitoring of the status of the individual drives.

In operation, the SBMC 18 (for example) initiates data transfers to all the devices by asserting an INTERRUPT signal and sending a "connect handshake" message to the SBS 17, the SBS spectrum apparatus 21 and the standby SBMC 18 (for example). This makes the SBMC 18 the master and the rest of the devices slaves. As will be described in greater detail hereinafter, the SBMC 19 could become the master and SBMC 18 the slave. Only the device whose address matches the address contained in the "connect handshake" message responds to the active SBMC.

The SBS 17, the SBMC's 18 and 19, and the SBS spectrum apparatus 21 comprise a maintenance subsystem which performs three major operations (i.e.,protocol). The beginning and ending "handshake", the slave signature packet and the information transfer data packet. With respect to the "handshake", the SBMC 18 or 19 initiates all links to the devices by asserting the INTERRUPT signal and sending a one byte "connect handshake" command. This command contains address data and a command code. The INTERRUPT signal is set until a response is received from the selected device or a connection timeout occurs. The communication link must be terminated with a "disconnect handshake". In order for the link to be successful, the SBS 17 must respond to the SBMC 18 with a "disconnect handshake" before releasing the bus 20 (i.e., disconnects).

The "signature packet" comprises a unique address for each SBS connected to a single SBMC. When a matching address is found between an SBS and the "connect handshake" from the SBMC, the selected SBS responds with a message called the "signature packet".

In order to standardize the communication protocol among the components, all information is transferred using a format called a "data packet". All control and status information passed between the SBMC 18 and the SBS 17 is contained within the "data packet".

At this juncture of the description, an overview of the protocol sequences would be helpful. The subsystem protocols follow four separate and distinct sequences. First, there is the "no change" sequence. Under normal operation (i.e., no change in either the SBS or SBMC parameters or status), the SBMC 18 generates a single byte "connect handshake" to a specific SBS address. The selected SBS enables its transmit buffer and responds with the "signature packet" byte. When the SBMC receives a response from the selected SBS, it removes INTERRUPT. In addition to normal parity and address verification, the SBMC checks the SBS response to determine if change is set. If a change is not detected, the SBMC sends a single byte "disconnect OK handshake". If no errors were detected by the SBS, then the SBMC responds with a "disconnect OK handshake", and releases the bus (i.e., disconnects).

The SBS data change sequence occurs if the selected SBS has detected a change in it status. The SBMC generates a single byte "connect handshake" to a specific SBS address. The selected SBS enables its transmit buffer and responds with the "signature package" byte (i.e., Change is set). When the SBMC receives a response from the selected SBS, it removes INTERRUPT. In addition to normal parity and address verification, the SBMC checks the SBS response to see if Change is set. If a change is detected, the SBMC sends a "signature packet" to the SBS (Change is set). This signals the SBS that a transfer of data is required to the SBMC from the SBS (i.e., "upload"). The SBS then uploads a Data Packet containing all of its operating and status parameters to the SBMC. The SBMC then performs parity and address verification. If the transfer is completed without communication errors, the SBMC sends a "disconnect handshake" to the SBS.

The SBMC sequence occurs if the SBMC wishes to send data to the SBS. The SBMC generates a single "connect handshake" byte to a specific SBS address. The selected SBS enables its transmit buffer and responds with the "signature packet" byte. When the SBMC receives a response from the selected SBS, it removes INTERRUPT. In addition to normal parity and address verification, the SBMC checks the SBS response to see if "Change" is set. If a change is detected, the SBMC will perform a Slave Data Change poll to the selected SBS immediately following the Master Data Change sequence. The SBMC then downloads a multiple data packet byte containing all of the operating parameters for the SBS. If no errors were detected by the SBS, then it responds with a "disconnect OK handshake", and releases the bus (i.e., disconnects).

Figure 2:
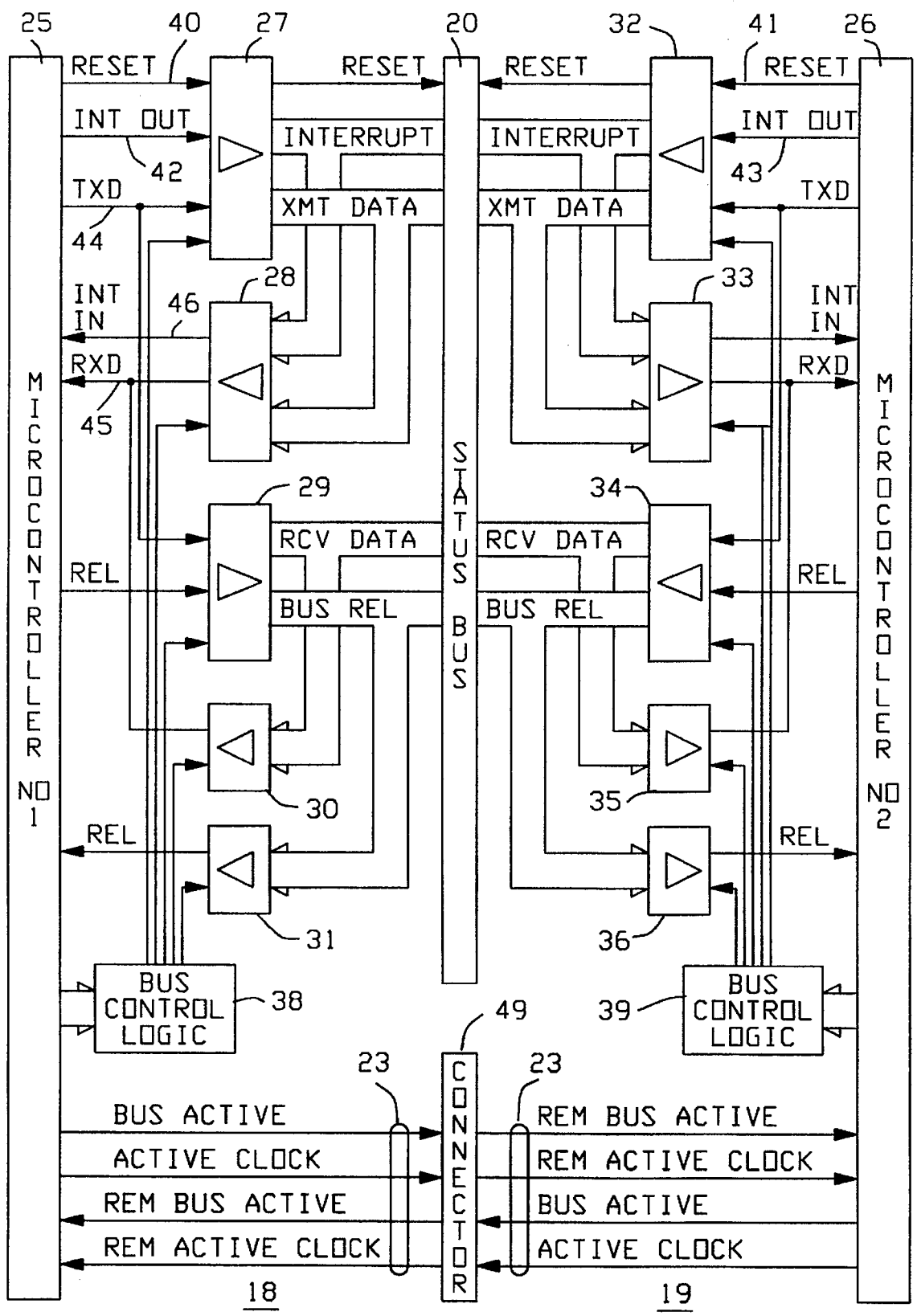
FIG. 2 is a block diagram of interconnections between two redundant Master Controllers coupled to a single status bus.
Figure 3:
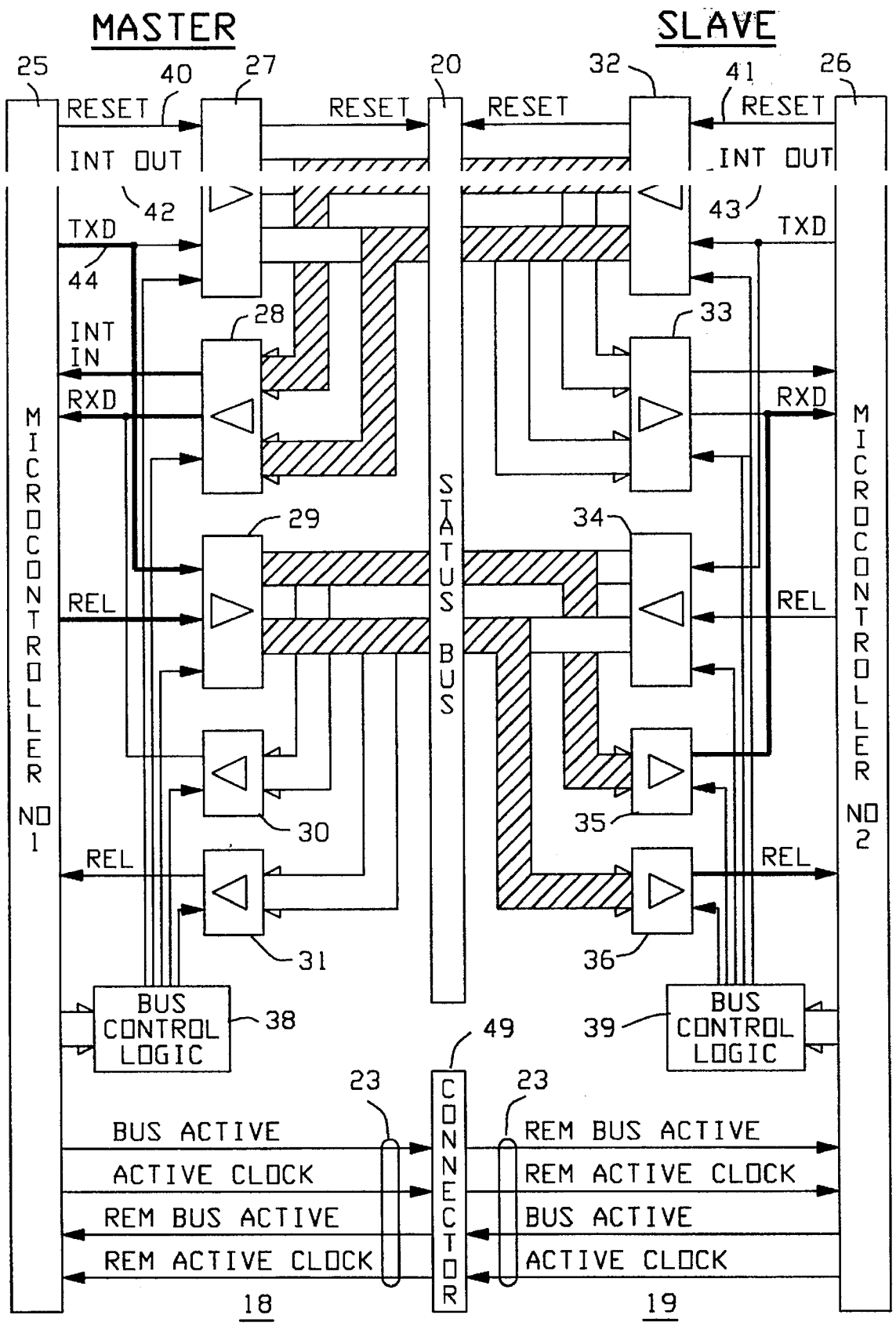
FIG. 3 is the same block diagram as shown in FIG. 2, with bus and line connections highlighted when a first Status Bus Master Controller is actively controlling the Status Bus.
Figure 4:
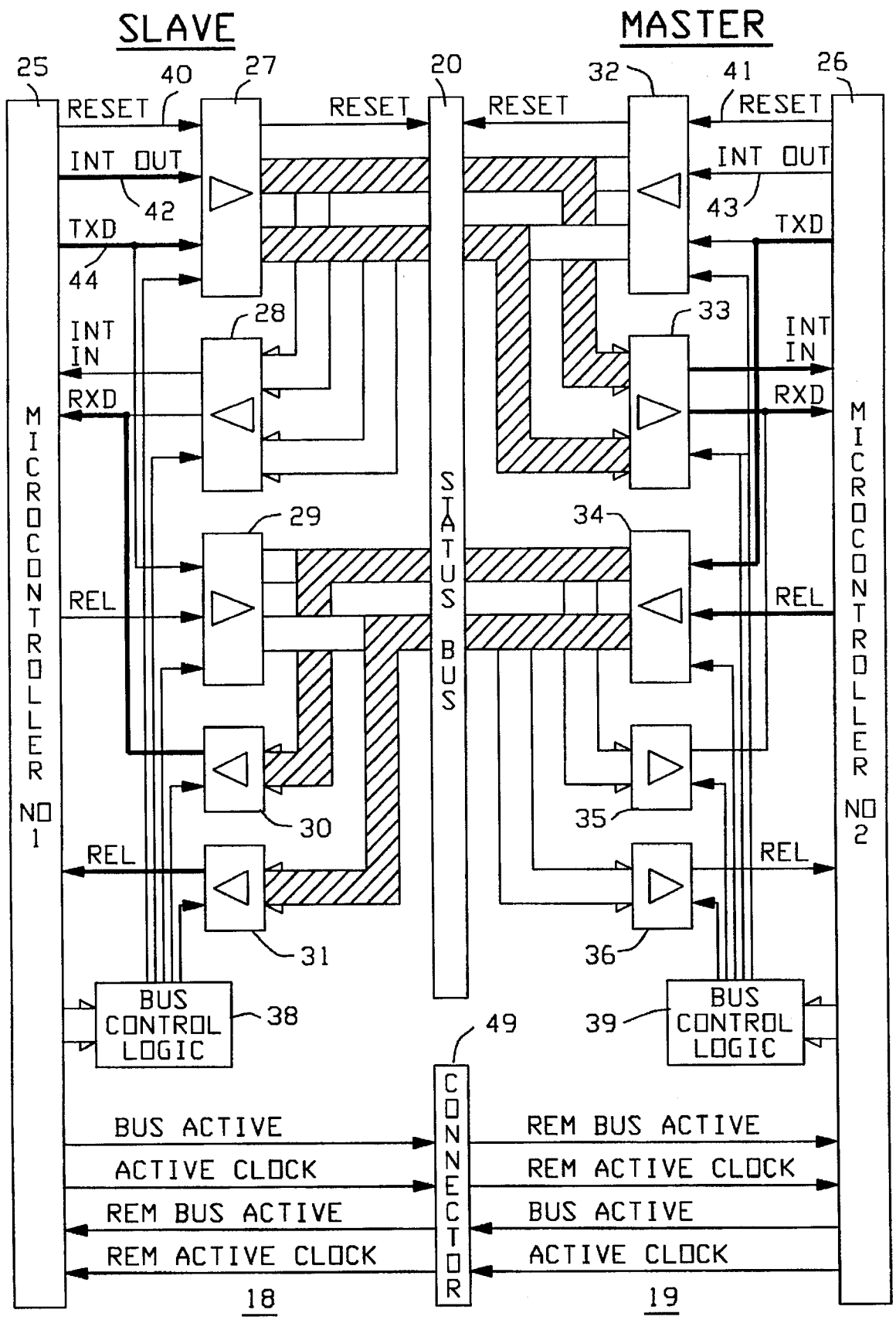
FIG. 4 is the same block diagram as shown in FIG. 2, but reversing the functions of the Master Controllers wherein a second or redundant Master Controller is actively controlling the Status Bus.

Referring now to FIG. 2, 3 and 4 together, FIG. 2 illustrates the component interconnections, FIG. 3 illustrates the data flow paths where SBMC 18 is the master or primary controller and the SBMC 19 is the slave or secondary controller; and, FIG. 4 illustrates the reverse situation. The left-hand side of FIG. 2 illustrates details of the SBMC 18 and the right-hand side of this figure illustrates details of the SBMC 19. Each SBMC contains a microcontroller 25 and 26, respectively; and, coupled to each microcontroller in a conventional manner are ROM and RAM memories (not shown).

The microcontrollers 25 and 26 may typically comprise any commercially available microcontroller, however in the disclosed embodiment an Intel 8031 Microcontroller is used. This microcontroller is available from Intel Corporation of Santa Clara, Calif. Moreover, the structure and operation of microcontrollers, similar to their use herein, is explained in greater detail in a book entitled "Microcontrollers: Architecture, Implementation, and Programming" by Kenneth Hintz and Daniel Tabak and published by McGraw-Hill, Inc. of New York, N.Y.

The Status Bus 20 is illustrated in the center of FIG. 2 between the microcontrollers 25 and 26. A set of registers 27 through 31 are coupled between input and output terminals of the microcontroller 25 and the Status Bus 20; and, in a similar manner a set of registers 32 through 36 are coupled between input and output terminals of the microcontroller 26 and the bus 20. A group of outputs from the microcontroller 25 are coupled to a bus control logic 38, and a similar group of outputs from the microcontroller 26 are coupled to a bus control logic 39. The logics 38 and 39 are conventional gating networks responsive to software flags from the microcontroller programs, which flags are described in greater detail hereinafter. The outputs of the logics 38 and 39 are coupled to enable the registers 27 through 31 and 32 through 36, respectively.

A reset signal line 40 is coupled from the microcontroller 25 through the register 27 to the bus 20; and, in a similar manner a reset signal line 41 is coupled from the microcontroller 26 through the register 32 to the same bus 20. The interrupt output signal from the microcontroller 25 is coupled to the register 27 on a line 42; and the interrupt output signal from the microcontroller 26 is coupled to the register 32 on a line 43. The transmit data ("TXD") output from the microcontroller 25 is coupled on a line 44 to the registers 27 and 29. The interrupt in ("INT IN") and read data ("RXD") inputs to the microcontroller 25 are provided from the register 28 on lines 45 and 46. The RXD line 45 is also coupled to an output from the register 30. The bus release signal ("REL") is coupled from an output of the register 31 to an input of the microcontroller 25. Similar connections are made to the microcontroller 26 and the registers 32 through 36.

The connections between the registers 27 through 31 and the status bus 20, as well as the connections between the registers 32 through 36 and the bus 20 are unique and provide for the bi-functionality of the SBMC's. For example, the interrupt signals at the output of the register 27 are coupled to both the status bus 20 and the inputs of the register 28. Similarly, the transmit data signals at the outputs of the register 27 are coupled to both the status bus 20 and the inputs of the register 28. The RXD outputs of the register 29 are coupled to the status bus and to inputs of the register 30. Similarly, the REL signals at the outputs of the register 29 are coupled to the status bus 20 and to inputs of the register 31. Identical signal lines are coupled between the status bus 20 and the registers 32 through 36.

Four control lines are connected between the SBMC's 18 and 19 via the interconnect cable 23. BUS ACTIVE is a low active signal generated by the active SBMC to indicate it has control of the status bus 20. This signal is connected to REMOTE BUS ACTIVE on the other SBMC. ACTIVE CLOCK is a 10 Hz clock output signal generated by the active SBMC. This signal is connected to REMOTE ACTIVE CLOCK on the other SBMC.

FIG. 3 depicts the status bus and control signal flow when the SBMC 18 is the master (i.e. primary) of the status bus 20 and the SBMC 19 is the slave or secondary controller. A combination of digital logic and firmware monitors the status bus 20 and the interconnect cable 23 at all times. If a failure is detected by the standby SBMC 19, it releases the active SBMC 18 from the status bus 20 and takes over control of the same, thereby becoming the master or primary SBMC. The SBMC 18 then assumes the slave or secondary role. Note in FIG. 3 that the interrupt out signal on the line 43 from the microcontroller 26 is coupled through the register 32 to the status bus 20; and, then coupled through the register 28 to the interrupt input terminal of the microcontroller 25. In a similar manner, the transmit data ("TXD") output of the microcontroller 26 is coupled through the same register 32, bus 20 and the register 28 to the receive data ("RXD") input of the microcontroller 25. Likewise, the transmit data ("TXD") output from the microcontroller 25 on the line 44 is coupled through the register 29 to the bus 20 and to through the register 35 to the receive data ("RXD") input of the microcontroller 26. The bus release "REL" signal follows the same path from the microcontroller 25 through the register 29 to the bus 20 and through the register 36 to the REL input terminal of the microcontroller 26.

FIG. 4 depicts the status bus and control signal flow when the secondary SBMC 19 becomes the master or primary controller and the primary SBMC 18 becomes the slave or secondary controller.

The status bus signals described herein are bi-directional. The active SBMC sends out data to the slave devices on the TXD lines; and, during standby, data is received on this pair of lines. The active SBMC receives data from the slave devices on the RXD lines; and during standby, data is transferred on this pair of lines. The active SBMC generates the status bus interrupt on the INTERRUPT lines; and during standby, the status bus interrupt is received on these lines. The standby SBMC generates the REL signal to the active SBMC before switching over to active operation if the standby SBMC detects a failure in the active SBMC. This signal is configured as an input to the reset circuitry when the SBMC is active.

Each SBMC is assigned a unique address which is read on power-up. The SBMC with the lowest address initially assumes the role of active or primary SBMC, and all others assume the role of standby or secondary SBMC's. The primary SBMC remains in the active role so long as there are no failures. Following are examples of failures which will cause the standby SBMC to assume control of the bus, thereby becoming the primary SBMC.

SELF-TEST FAIL—If the master SBMC detects a failure during self-test, BUS ACTIVE is set high, ACTIVE CLOCK is stopped and the master SBMC switches to slave emulation mode.

SBMC FAILURE—If the master SBMC stops due to an internal or clock failure, the ACTIVE CLOCK stops and the slave SBMC generates a REL strobe to the reset circuitry of the master SBMC. The slave SBMC then switches to master emulation mode.

This scenario also applies if the master SBMC program counter is forced outside the regular program boundaries. The remainder of the ROM is filled with non-ops, except for a few bytes at the end of the address space which turns off the ACTIVE CLOCK generator. In this case, the ACTIVE CLOCK stops and the slave SBMC generates a REL strobe to the reset circuitry of the master SBMC. The slave SBMC then switches to master emulation mode.

INTERRUPT TIMEOUT—If the slave SBMC does not receive an interrupt from the master SBMC within thirty (30) seconds, the slave SBMC generates a REL strobe to the reset circuitry of the master SBMC. The slave SBMC then switches to master emulation mode.

Figure 5:
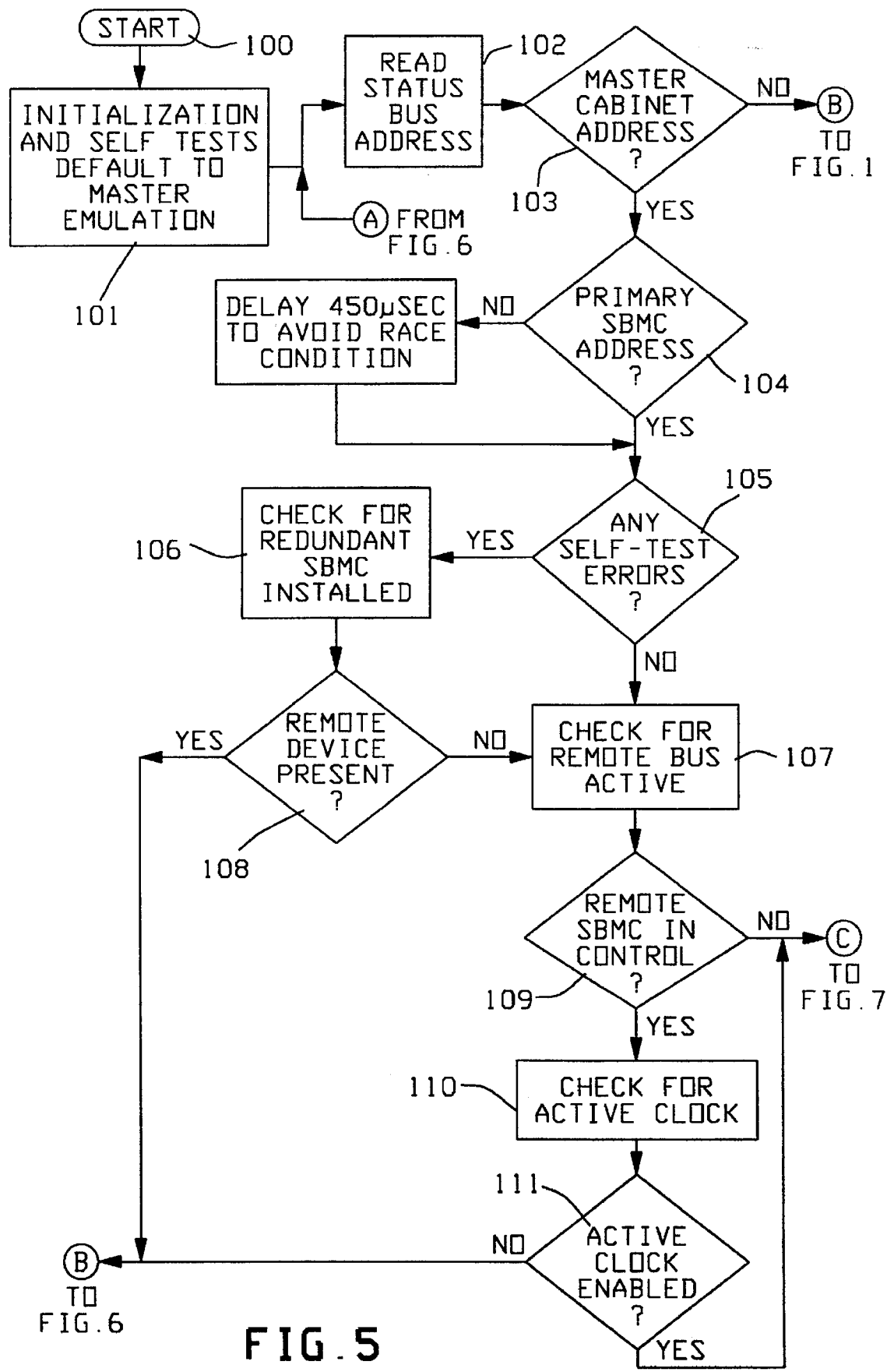
FIG. 5 is a flow chart illustrating the steps performed in initializing the controller and performing the initial selection (i.e., arbitration) of the master and slave SBMC's.

Referring now to FIG. 5, a flow chart illustrates the steps performed in initializing each of the disk drives coupled to the storage data module. From start bubble 100 an initialization and self test is performed with a default to Master Emulation (block 101). Next, the status bus address is read, block 102, followed by an inquiry as to whether or not the address read is for the master controller cabinet (diamond 103). If the answer to this inquiry is no, then a branch is taken to Slave Emulation shown in FIG. 6 and described further hereinbelow.

If the answer to the inquiry of diamond 103 is yes, then another inquiry is made as to whether or not the address is the primary SBMC address (diamond 104). If the answer is no then a branch is taken to a 450 microsecond time delay so as to avoid a race condition. That is, the time delay allows sufficient time for the master/slave selection arbitration to be completed without both SBMC's vying to be master at the same time.

If the answer to the inquiry of diamond 104 is yes, then another inquiry is made as to whether or not there were any self-test errors (diamond 105). If there was a self-test error (i.e., yes branch) then a check is made as to whether or not redundant SBMC's are installed (block 106). On the other hand, if no self-test errors were found, then a check is made for remote bus active (block 107).

Following the check for redundant SBMC's an inquiry is made as to whether or not a remote device is present (diamond 108). If the answer is no, then the same function check for remote bus active is performed, block 107. If a remote device is present, then a branch is taken to Slave Emulation as shown in FIG. 6.

Following the check for remote bus active, an inquiry is made as to whether or not a remote SBMC is in control, diamond 109. If the answer is no, then a branch is taken to Master Emulation as shown in FIG. 7 and described further hereinbelow. However, if the answer is yes then a check is made for active clock (block 110). Following this function, an inquiry is made as to whether or not the active clock is enabled, diamond 111. If the answer is yes then a branch is taken to Master Emulation (FIG. 7); and, if the answer is no then a branch is taken to Slave Emulation (FIG. 6).

Figure 6:
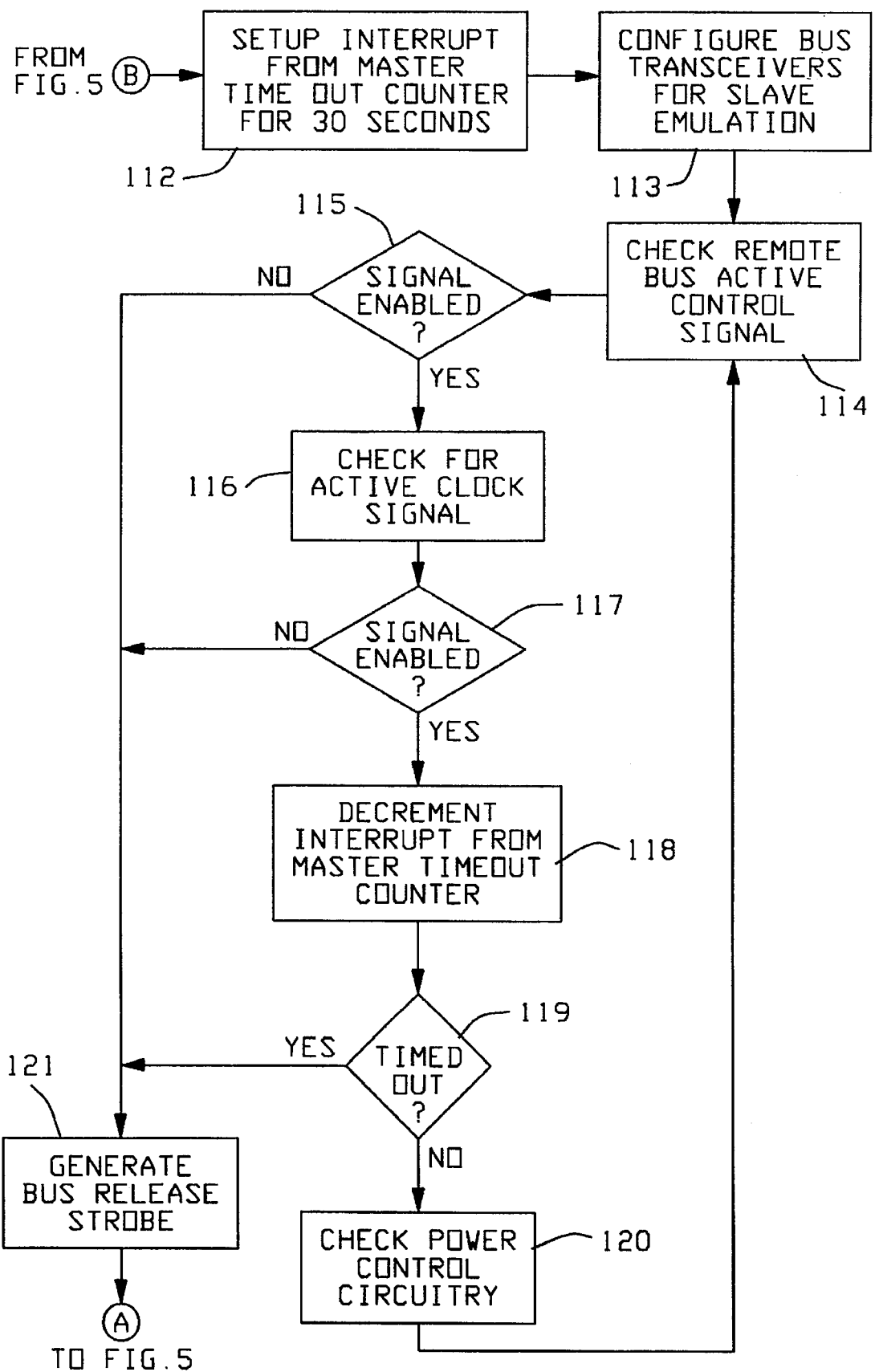
FIG. 6 is a flow chart illustrating the steps performed for Slave Emulation.
Figure 7:
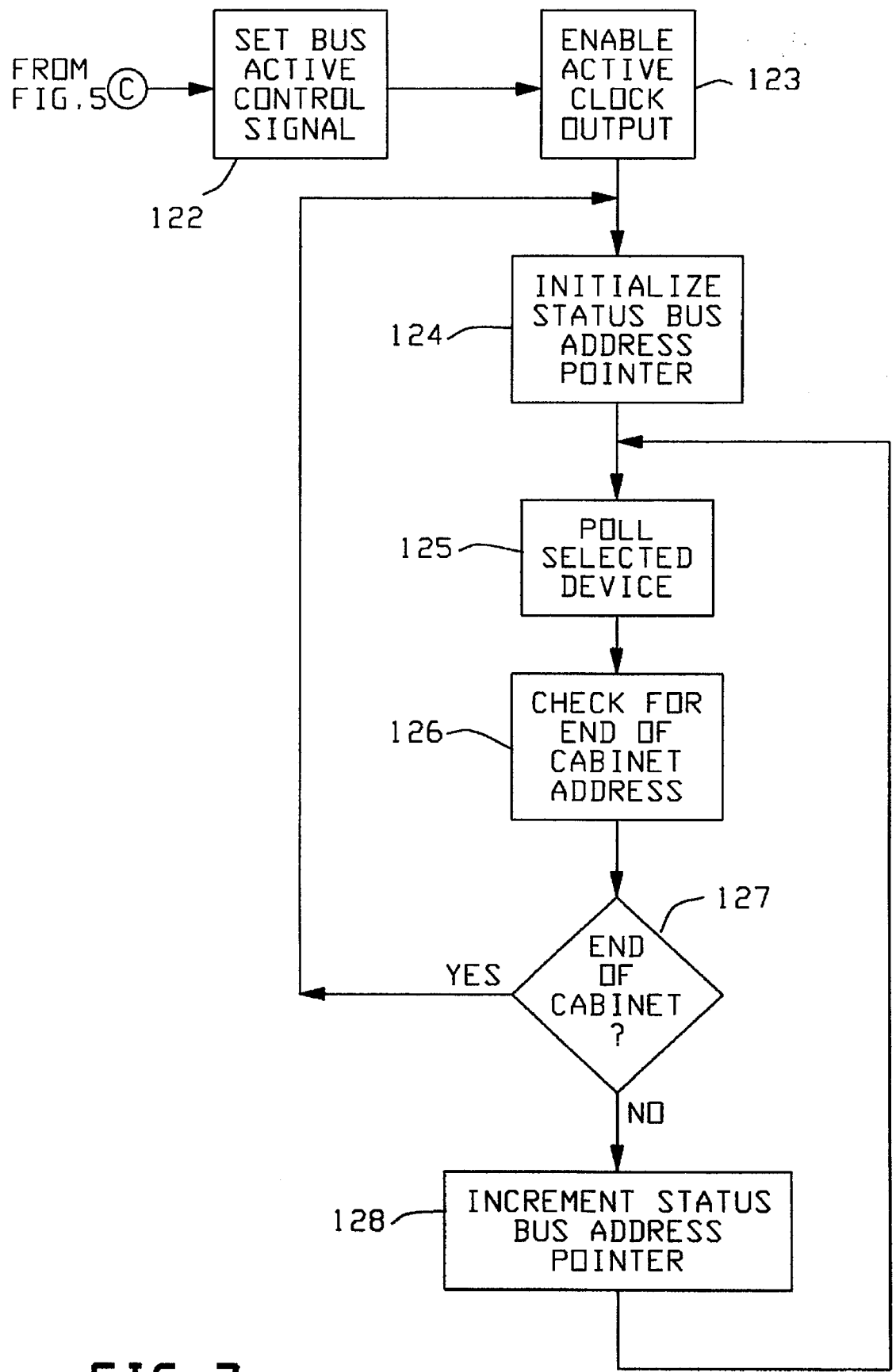
FIG. 7 is a flow chart illustrating the steps performed for Master Emulation.

Referring now to FIG. 6, details of the steps of the Slave Emulation are shown in a flow chart format. The entry point is denoted by the bubble "B" from FIG. 5; and, it is at this point that the bus control logics 38 and 39 reverse the bus direction. In particular, with reference to FIG. 4, registers 27, 30 and 31 are enabled while registers 28 and 29 are disabled by the logic 38; and, registers 33 and 34 are enabled while registers 32, 35 and 36 are disabled by the logic 39.

The first function to perform in Slave Emulation is to set an interrupt master timeout counter for 30 seconds, block 112. The slave SBMC looks on the SBS bus 20 for interrupts; and, interrupts occur no less frequently than every 30 seconds. If no interrupt is detected for a time period greater than 30 seconds, then this is interpreted to be a problem with the master SBMC and the slave SBMC takes over and becomes the master.

Next, the bus transceivers are configured for slave emulation (block 113). Following this function, a check is made of the remote bus active control signal (block 114). An inquiry is next made as to whether or not the signal is enabled (diamond 115). If yes, then a check is made for active clock signal, block 116. An inquiry is now made as to whether or not the active clock signal is enabled, diamond 117. If yes, then the master counter is decremented for the interrupt, block 118. An inquiry is next made as to whether or not the counter has timed out, diamond 119. If no, then the status of the power control circuitry (not illustrated) is checked, block 120. Following this, a return is made back to the function block 114 to check for remote bus active control signal, and the cycle starts over again.

If the bus active control signal is not enabled, then the no branch is taken to generate the bus release strobe (block 121). Likewise, if the active clock signal is not enabled (diamond 117), then a no branch is taken to the function block 121. In a similar manner, if the master timeout counter is timed out (diamond 119) then the yes branch is taken to the same function block 121.

Returning back to FIG. 5, if the remote SBMC is not in control (diamond 109 no branch) or the active clock is enabled (diamond 111 yes branch), then a branch is taken to Master Emulation shown in FIG. 7. Entry is made at bubble "C" from FIG. 5; and, it is at this point that the bus control logics 38 and 39 again reverse the bus direction. In particular, with reference to FIG. 3, registers 28 and 29 are enabled, while registers 27, 30 and 31 are disabled by the logic 38; and, registers 32, 35 and 36 are enabled while registers 33 and 34 are disabled by the logic 39.

The first function to perform in Master Emulation is to set the bus active control signal, block 122. Next, the active clock output is enabled, block 123. Following these functions, the status bus address pointer is initialized, block 124.

The selected device is polled (block 125), and then a check is made for end of cabinet address (block 126). An inquiry is made as to whether or not the end of cabinet has been reached (diamond 127); and, if so, a return is made to block 124 to initialize the status bus address pointer. On the other hand, if the end of cabinet has not been reached a branch is taken to increment the status bus address pointer (block 128). Following this function, a return is made to poll the selected device, block 125. These steps will continue so long as power is present and there are no problems.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method in a computer peripheral control system for initializing and monitoring operations of a plurality of peripheral device controllers, said peripheral control system including a primary master controller and a secondary master controller with a status bus coupled therebetween, each of said master controllers including a micro-controller executing said method comprising the steps of:

a. storing in registers of each of said master controllers an initial set of parameters for directing operation of said peripheral control system;

b. executing a self test of each of said master controllers to determine if any errors have occurred;

c. and if an error has been determined in the preceding step, checking to verify presence of said secondary master controller;

d. detecting whether or not said secondary master controller is in control;

e. if said secondary master controller is in control as detected in the preceding step, checking for presence of an active clock signal therefrom, thereby indicating that said secondary master controller is in control of said status bus;

f. if said active clock signal of said secondary master controller is present, setting a master time-out counter for an outside time period limit for which an interrupt could have been received from said secondary master controller;

g. configuring bus transceivers for said primary master controller for slave emulation;

h. verifying presence of a bus active control signal from said secondary master controller;

i. if said bus active control signal verified in the preceding step is present, checking for a remote active clock signal from said secondary master controller;

j. if said remote active clock signal is active as checked in the preceding step, determining if said master time-out counter has timed out;

k. if said master time-out counter has not timed out, checking power control circuitry of said peripheral control system for a possible failure; and, l. repeating the steps h through k hereof.

2. The method as in claim 1 where no bus active control signal is present from said secondary master controller further including the steps of generating a bus release strobe and repeating the steps c through m of claim 14.

3. The method as in claim 1 where no remote active clock signal is present from said secondary master controller further including the steps of generating a bus release strobe and repeating the steps c through m of claim 14.

4. The method as in claim 1 where said master time-out counter has timed out further including the steps of generating a bus release strobe and repeating the steps c through m of claim 14.

5. A method in a computer peripheral control system for controlling and monitoring a plurality of peripheral device controllers, said system including more than one master controller for monitoring and controlling said peripheral device controllers, said method comprising the steps of:

a. storing in registers of said master controllers an initial set of parameters for directing operation of said peripheral control system;

b. executing a self test of each of said master controllers to determine if any errors have occurred;

c. and if an error has occurred as determined in the preceding step, checking to verify presence of a redundant master controller;

d. detecting whether or not said redundant master controller is in control;

e. if said redundant master controller is not in control as detected in the preceding step, setting bus active control signals for said master controller;

f. enabling active clock output signals for said master controller;

g. initializing a status bus address pointer for said master controller;

h. polling a selected one of said peripheral device controllers to determine if an error has occurred;

i. checking for end of cabinet address to determine if last of said peripheral device controllers has been reached, and if it has not yet been reached;

j. incrementing status bus address pointer so as to poll another one of said peripheral device controllers;

k. repeating steps g through j hereof;

l. if said redundant master controller is in control, checking for presence of an active clock signal from said redundant master controller;

m. if said active clock for said redundant master controller is not present, setting a time-out counter for an outside time period limit for which an interrupt could have been received from said redundant master controller;

n. configuring bus transceivers of said redundant master controller for slave emulation;

o. verifying presence of a bus active control signal from said redundant master controller;

p. if said bus active control signal is present as verified in the preceding step, checking for a remote active clock signal from said redundant master controller;

q. if said remote active clock signal is active from said redundant master controller as checked in the preceding step, determining if said master time-out counter has timed out;

r. if said master time-out counter has not timed out as determined in the preceding step, checking power control circuitry to determine if a failure has occurred; and, s. repeating steps o through r hereof.

6. In a computer system having a CPU and peripheral devices with device controllers therefor, and having a peripheral control system disposed between said CPU and said peripheral device controllers for controlling and monitoring said peripheral device controllers, said peripheral control system including a primary and a secondary master controller with a status bus coupled therebetween, each of said master controllers including a micro-controller executing a method for controlling and monitoring operation of said device controllers, said method comprising the steps of:

a. storing in registers of each of said master controllers an initial set of parameters for directing operation of said peripheral control system;

b. executing a self test of each of said master controllers to determine if any errors have occurred;

c. determining if an address received from said CPU is for said primary master controller, and if so;

d. and if no self-test errors were determined to have occurred in step b hereof, detecting whether or not said secondary master controller is in control, and if it is not in control, setting bus active control signals in said primary master controller in order to emulate master control;

e. setting a bus active control signal of said primary master controller to indicate control of said status bus by said primary master controller;

f. initializing a status bus address pointer in said primary master controller for addressing a first one of said peripheral device controllers;

g. monitoring operation of each of said peripheral device controllers by said primary master controller by polling a selected one of said peripheral device controllers at an address initialized in the preceding step to determine if a problem has occurred;

h. checking for end of cabinet address to determine if last of said peripheral device controllers has been reached, and if it has not yet been reached;

i. incrementing status bus address pointer so as to poll another one of said peripheral device controllers;

j. repeating steps f and g hereof until end of cabinet address has been reached, and when it has been reached, repeating steps e through h hereof;

k. if said secondary master controller is in control as detected in step d hereinabove, setting a bus active control signal in said secondary master controller thereby indicating control of said status bus by said secondary master controller so as to reverse direction of signal flow on said status bus in order to emulate slave control;

l. verifying presence of said bus active control signal from said secondary master controller, and if it is present, checking for a remote active clock signal from said secondary master controller, and if it is active, determining if a master time-out counter has timed out;

m. if said master time-out counter has not timed out, checking power control circuitry to determine if a failure has occurred; and, n. repeating steps j and l hereof.

7. A method as in claim 6 wherein said address received from said CPU is for said secondary master controller and not said primary master controller further including the step of delaying action by setting said master time-out counter for an outside time period limit for which an interrupt could have been received from said secondary master controller and where no bus active control signal is sensed from said secondary master controller, generating a bus release strobe signal and repeating the steps c through m of claim 14.

8. A method as in claim 6 wherein no remote active clock signal is sensed from said secondary master controller further including the step of generating a bus release strobe and repeating the steps c through m of claim 14.

9. A method as in claim 6 wherein said master time-out counter has timed out further including the step of generating a bus release strobe and repeating the steps c through m of claim 14.

* * * * *